United States Patent
Watanabe et al.

(10) Patent No.: US 7,587,933 B2
(45) Date of Patent: Sep. 15, 2009

(54) PROCESS FOR REPAIRING PUNCTURED PNEUMATIC TIRE IN TIRE-RIM ASSEMBLY AND REPAIRING SYSTEM

(75) Inventors: Shinichi Watanabe, Tokyo (JP); Frank Knothe, Gerlingen (DE); Gerd Runtsch, Remseck (DE); Guenter Leister, Schwaigern (DE); Frank Klempau, Stuttgart (DE)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/591,185

(22) PCT Filed: Dec. 22, 2004

(86) PCT No.: PCT/JP2004/019691

§ 371 (c)(1), (2), (4) Date: Jun. 28, 2007

(87) PCT Pub. No.: WO2005/082646

PCT Pub. Date: Sep. 9, 2005

(65) Prior Publication Data

US 2007/0289371 A1 Dec. 20, 2007

(30) Foreign Application Priority Data

Mar. 1, 2004 (JP) ............... 2004-056658

(51) Int. Cl.
*G01M 17/02* (2006.01)
(52) U.S. Cl. ..................... 73/146
(58) Field of Classification Search ........ 73/146–146.8; 340/442–447
See application file for complete search history.

(56) References Cited

U.S. PATENT DOCUMENTS

| 4,969,493 | A | * | 11/1990 | Lee ............................ 141/38 |
| 5,158,627 | A | | 10/1992 | Saneto et al. |
| 2007/0171038 | A1 | * | 7/2007 | Maekawa ................... 340/447 |

FOREIGN PATENT DOCUMENTS

| CH | 499 406 A | 1/1971 |
| EP | 0 285 510 A | 10/1988 |
| EP | 0371755 A2 | 6/1990 |
| EP | 0456437 A2 | 11/1991 |

(Continued)

*Primary Examiner*—Andre J Allen
*Assistant Examiner*—Jermaine Jenkins
(74) *Attorney, Agent, or Firm*—Sughrue Mion, PLLC

(57) ABSTRACT

A punctured pneumatic tire in a tire-rim assembly is repaired by mounting on a vehicle the tire-rim assembly provided with an internal pressure alarm means, said tire comprising an auxiliary load-supporting structure satisfying a requirement that an deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero; detecting a puncture of the tire produced during the running of the tire by the internal pressure alarm means; unavoidably running the punctured tire to a relatively short-range safe place to quickly stop the vehicle; and refilling gas to a given internal pressure by a gas filling means equipped on the vehicle while occluding a punctured hole with a puncture repairing means equipped on the vehicle.

17 Claims, 2 Drawing Sheets

FOREIGN PATENT DOCUMENTS

| | | |
|---|---|---|
| EP | 0545681 A1 | 6/1993 |
| EP | 0 753 420 A2 | 1/1997 |
| EP | 0 988 960 A2 | 3/2000 |
| JP | 49 20802 | 2/1974 |
| JP | 49-116702 | 11/1974 |
| JP | 59-26308 A | 2/1984 |
| JP | 3-121913 A | 5/1991 |
| JP | 9-118779 A | 5/1997 |
| JP | 2000-103905 A | 4/2000 |
| JP | 2001-212883 A | 8/2001 |
| JP | 2003-63221 A | 3/2003 |
| JP | 2003-159918 A | 6/2003 |
| JP | 2003-165315 A | 6/2003 |

* cited by examiner

PROCESS FOR REPAIRING PUNCTURED PNEUMATIC TIRE IN TIRE-RIM ASSEMBLY AND REPAIRING SYSTEM

TECHNICAL FIELD

This invention relates to a process for repairing a punctured pneumatic tire in a tire-rim assembly and a repairing system.

BACKGROUND ART

In general, when the pneumatic tire is punctured during the running, the vehicle is moved (evacuated) at a decelerated rate up to a safe place such as a tire repairing factory or the like, which is located in a relatively short range from the punctured position (concretely, about 50 km at maximum, usually about 10-20 km), and then the punctured tire is subjected to a repairing at this place.

In the puncture of the pneumatic tire, however, the support of load through an internal pressure is lost and also the tire itself has not a reinforcing structure capable of supporting the load, so that the tire is largely deformed at a crushed state and hence the steering performance is apt to be violently lowered, and it is assumed that when the tire is particularly punctured during the running at a high speed, the driver encounters into a very risky status.

Further, the punctured tire is forced into the running at a large crushed state under loading because the deformation quantity of the tire in the radial direction at the punctured state becomes generally about 80% of a section height of the tire at a normal state. Even if the vehicle is unavoidably moved up to the relatively short-range safe place after the puncture, a sidewall portion of the tire is strongly deformed between a rim flange and a road surface in the unavoidable running, and particularly rubber parts inside the sidewall portion of the tire are repeatedly rubbed with each other, so that there is a fear that the inner face of the tire is damaged but also there is a possibility that the outer face of the sidewall portion or further the rim flange or the like are damaged.

In the conventional pneumatic tire, therefore, it is possible to largely damage the tire due to the unavoidable running at the punctured state. Once the tire is damaged, there is a possibility that the damaged tire can not be turned to an original state even by repairing.

Furthermore, JP-A-2003-63221, JP-A-2003-159918 and JP-A-2003-165315 disclose an alarm device wherein the occurrence of puncture during the running of the tire is detected and the detected signal is informed to the driver. In addition, JP-A-9-118779, JP-A-2001-212883 and JP-A-2000-103905 disclose a puncture repairing kit (consisting of a sealant sealing the punctured hole and an air filling device feeding air into the inside of the tire) for turning the punctured tire to a normal state before the puncture.

However, there is not yet found a technique of combining the alarm device or the puncture repairing kit with a pneumatic tire having a structure of controlling the damage of the tire produced by the unavoidable running at the punctured state.

On the other hand, there are developed so-called run-flat tires capable of running over a significant distance (concretely, a running distance of about 200-300 km at a speed of 80 km/h without causing troubles in view of the steering performance) even if the tire is punctured. Such a run-flat tire is a special tire dispensing a spare tire to be mounted onto the vehicle. As the run-flat tire, there are mainly mentioned so-called side-reinforcing type run-flat tires wherein the sidewall portion is strengthened with a reinforcing rubber layer (e.g. JP-A-49-20802, JP-A-49-116702 and the like) and so-called core type run-flat tires wherein a metal support or the like is disposed in the inside of the tire (e.g. JP-A-59-26308, JP-A-3-121913 and the like).

However, the side-reinforcing type run-flat tire is mainly developed in order that the running at the run-flat state is enabled by arranging a thick reinforcing rubber on the sidewall portion to increase a bending rigidity of the sidewall portion, so that there is a tendency that when such a tire is generally run at a normal state under an air inflation, the ride comfort and the rim-assembling property are deteriorated as compared with the ordinary pneumatic tire having no reinforcing rubber but also there is a problem that the arrangement of the thick reinforcing rubber brings about the increase of the weight and hence the increase of the rolling resistance. Particularly, in case of a super-low profile run-flat tire having an aspect ratio of not more than 55%, the deterioration of the ride comfort and rim-assembling property becomes conspicuous due to the fact that the height of the sidewall portion becomes low.

On the other hand, when the core type run-flat tire is generally run at the normal state, since the tire and the support arranged therein are maintained at a non-contact state owing to the presence of air filled in tire so as not to substantially develop the function of the support, the ride comfort is substantially equal to that of the ordinary pneumatic tire having no reinforcing rubber. However, the support should be newly arranged in the tire as an additional member, so that the rim-assembling property is deteriorated by the arrangement of the support as compared with the ordinary pneumatic tire and also there is a problem of increasing the weight and hence the rolling resistance.

DISCLOSURE OF THE INVENTION

The invention targets at a pneumatic tire capable of unavoidably running at a relatively short range under puncture instead of a run-flat tire capable of running over a significant distance (concretely, a running distance of about 200-300 km at a speed of 80 km/h without causing troubles in view of the steering performance) under puncture, and is to provide a process for repairing a punctured pneumatic tire in a tire-rim assembly and a repairing system in which the damage of the tire can be effectively suppressed in the unavoidable running under puncture and the running is restarted by only a simple repairing.

In order to achieve the above object, the first aspect of the invention lies in a process for repairing a punctured pneumatic tire in a tire-rim assembly which comprises steps of;

mounting on a vehicle an assembly of a pneumatic tire and an approved rim provided with means for raising an internal pressure alarm, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that a deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;

detecting a puncture of the tire produced during the running of the tire by the means for raising an internal pressure alarm;

unavoidably running the punctured tire to a relatively short-range safe place to quickly stop the vehicle; and refilling gas inside the tire, which is emitted due to the puncture, to a given internal pressure by a gas filling means equipped on the vehicle while occluding a punctured hole with a puncture repairing means equipped on the vehicle.

Moreover, the term "approved rim" used herein concretely means an approved rim corresponding to a tire size designation defined in the following standards and the term "given internal pressure" used herein concretely means an air pressure corresponding to a maximum load (a maximum load capacity) when the tire is mounted as a single on the approved rim defined therein.

And also, the above standards are determined by industrial standards available at an area in which the tires are produced and used, respectively. For example, in United States is defined by "Year Book published by The Tire and Rim Association Inc.", in Europe is defined by "Standards Manual published by The European Tire and Rim Technical Organization", and in Japan is defined by "JATMA Year Book published by The JAPAN AUTOMOBILE TIRE MANUFACTURERS ASSOCIATION, INC.".

In the invention, it is preferable that the deformation quantity of the tire is within a range of 35-50%.

In the invention, it is preferable that the auxiliary load-supporting structure is constructed so as not to at least contact inner surface parts located at the same sidewall portion with each other even in the unavoidable running at the puncture state. As the auxiliary load-supporting structure is preferable a thin-walled rubber reinforcing layer arranged between the plies of the carcass or at an inner surface side of the carcass and at least over a full region of the sidewall portion.

Further, it is preferable that the tire has an aspect ratio of 30-55% in view of a potential to the bending inherent to the tire size or a rigidity balance in the aspect ratio based on the size.

In addition, it is preferable that the deformation quantity of the tire to be mounted on a front wheel of the vehicle is 35-45%, and the deformation quantity of the tire to be mounted on a rear wheel of the vehicle is 40-50%.

The second aspect of the invention lies in a system for repairing a punctured pneumatic tire in a tire-rim assembly pneumatic tire mounted on a vehicle comprising;

an assembly of a pneumatic tire and an approved rim, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that an deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;

means provided on the tire-rim assembly for detecting a puncture of the tire during the running and raising an internal pressure alarm;

a puncture repairing means equipped on the vehicle for occluding a puncture hole of the tire; and a gas filling means provided on the vehicle for refilling gas inside the tire, which is emitted due to the puncture, to a given internal pressure.

According to the invention, when using the pneumatic tire capable of unavoidably running at a relatively short range under puncture instead of the run-flat tire capable of running over a significant distance (concretely, a running distance of about 200-300 km at a speed of 80 km/h without causing troubles in view of the steering performance) under puncture, it is possible to provide a process for repairing a punctured pneumatic tire in a tire-rim assembly and a repairing system in which the damage of the tire can be effectively suppressed in the unavoidable running under puncture and the running is restarted by only a simple repairing.

BRIEF DESCRIPTION OF DRAWINGS

The invention will be described with reference to the accompanying drawings, wherein.

BEST MODE FOR CARRYING OUT THE INVENTION

Figure 1:
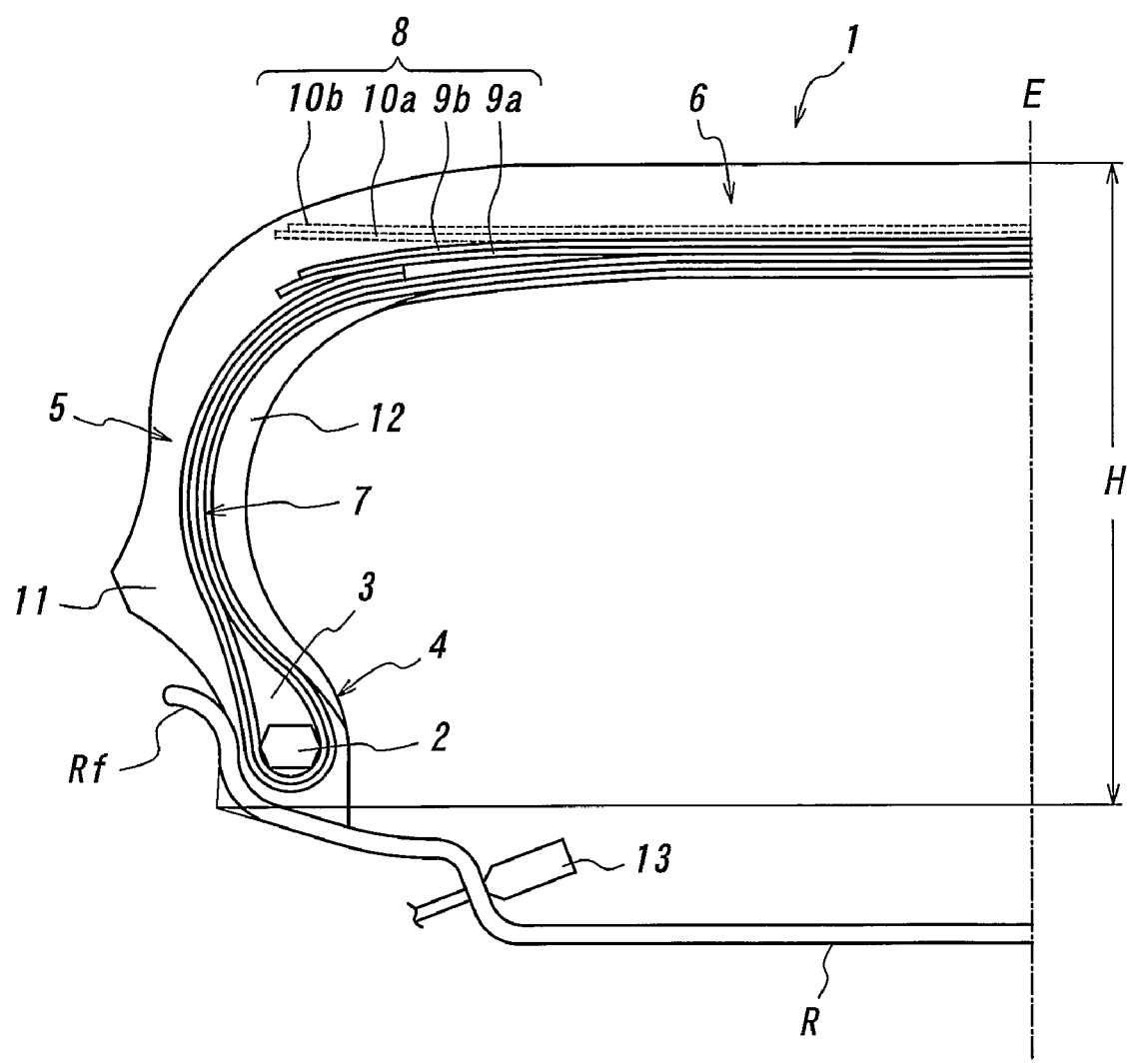
FIG. 1 is a left-half cross-sectional view of a pneumatic tire constituting a system for repairing a punctured tire in a tire-rim assembly according to the invention under no load condition that a tire internal pressure at a rim-assembled state is zero.

A pneumatic tire 1 shown in FIG. 1 comprises a pair of bead portions 4 each embedding a bead core 2 and a bead filler 3 located just above the bead core, a pair of sidewall portions 5, a tread portion 6, a carcass 7 of at least one ply, two plies in the illustrated embodiment toroidally extending between the bead portions, and a belt 8 disposed on an outer circumference of a crown portion of the carcass 7 to reinforce the tread portion 6 and comprised of at least one belt layer. The carcass 7 is wound around the bead core 2 from an inside toward an outside in a widthwise direction of the tire, and each turnup end portion thereof is extended to a position of each end portion of the belt 8 to form a so-called envelop structure. In the illustrated embodiment, the belt 8 comprises two main belt layers 9a, 9b, cords of which layers being crossed with each other with respect to an equatorial plane E of the tire, and two auxiliary belt layers 10a, 10b (shown by dotted lines), cords of which layers are arranged substantially in parallel to the equatorial plane E. For the purpose of preventing a flange Rf of a rim R from damaging with curbstone or the like, as shown in FIG. 1, a rim guard 11 formed so as to protrude outward from the rim flange Rf in the widthwise direction of the tire is arranged on an outer face of the bead portion 4 of the tire 1 at a position adjacent to the rim flange Rf.

Figure 2:
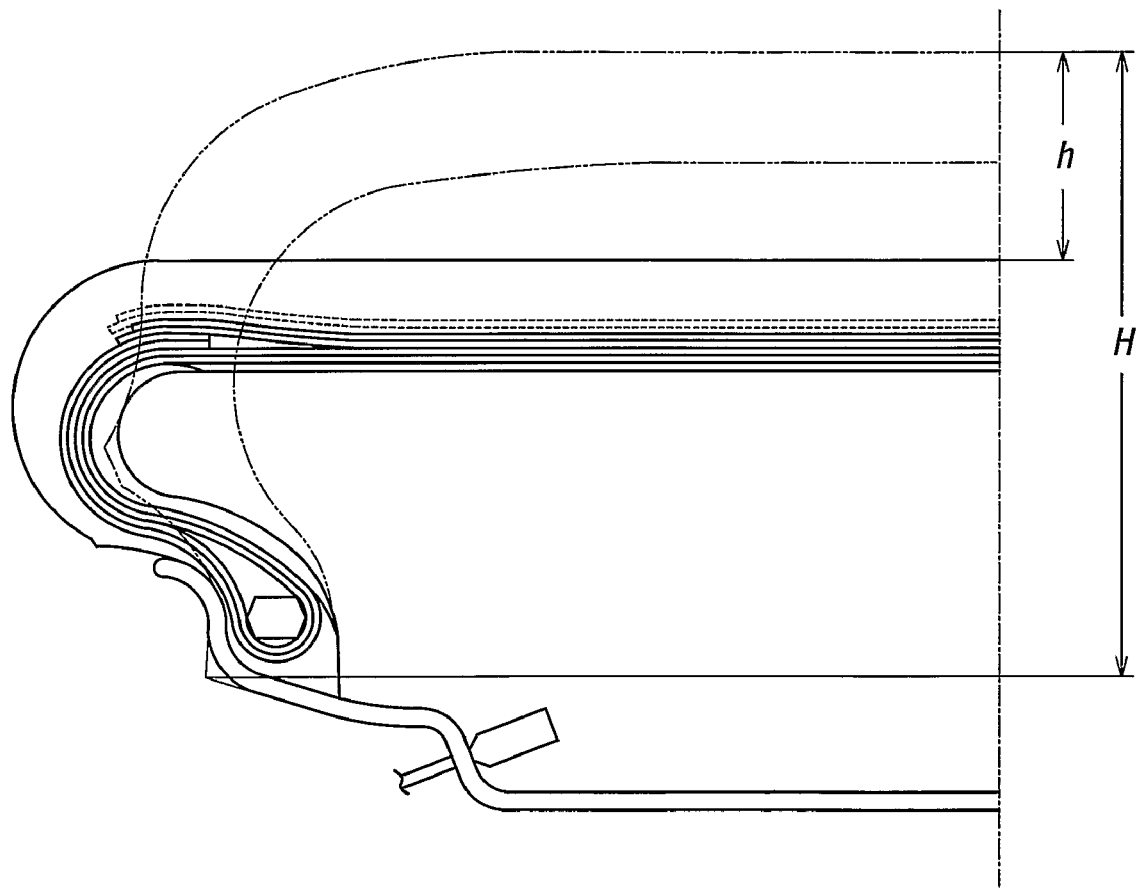
FIG. 2 is a left-half cross-sectional view of a pneumatic tire under such a static load condition that the tire is subjected to a load corresponding to 90% of maximum load capacity at a tire internal pressure of zero.

As a main feature in the construction of the invention, the pneumatic tire 1 comprises an auxiliary load-supporting structure 12 satisfying a requirement that an deformation quantity h (see FIG. 2) of the tire in a radial direction thereof at a rim-assembled state under a load corresponding to 90% of a maximum load capacity at an internal tire pressure of zero is within a range of 30-60% of a section height H of the tire under no load at the internal tire pressure of zero, but also when a tire-rim assembly is constituted by assembling the tire 1 onto an approved rim of a wheel and then mounted onto a vehicle, there are provided a means 13 provided on the tire-rim assembly for detecting a puncture of the tire during the running and raising an internal pressure alarm, a puncture repairing means (not shown) equipped on the vehicle for occluding a puncture hole of the tire after the vehicle is unavoidably run to a relatively short-range safe place and rapidly stopped at this place, and a gas filling means (not shown) provided on the vehicle for refilling gas inside the tire, which is emitted due to the puncture, to a given internal pressure. Thus, the damage of the tire can be effectively suppressed in the unavoidable running under puncture and the running is restarted by only a simple repairing.

In the puncture, the sidewall portion 5 of the tire 1 is strongly pressed between the rim flange Rf and a road surface. In the invention, therefore, the pneumatic tire 1 is provided with the auxiliary load-supporting structure 12 rendering the deformation quantity of the tire in the radial direction under the above condition assuming the puncture into a proper range, concretely the auxiliary load-supporting structure 12 strengthening the tire to such a level that rubber parts in the inner face of the sidewall portion located at the same side of the tire are not rubbed with each other even in the running under puncture without sacrificing the ride comfort and the rim-assembling property in the usual running at the normal state under a given internal pressure as in the side-reinforcing type run-flat tire, whereby the damage of the tire in the running under puncture can be effectively suppressed.

The reason why the deformation quantity h of the tire in a radial direction thereof at a rim-assembled state under a load corresponding to 90% of a maximum load capacity at an internal tire pressure of zero is within a range of 30-60% of a section height H of the tire under no load at the internal tire pressure of zero is due to the fact that when the deformation quantity h is less than 30%, the rigidity in the radial direction of the tire is too high and the ride comfort in the running at the normal state under the given internal pressure and the rim assembling property are considerably deteriorated, while when it exceeds 60%, the steering stability in the puncture rapidly lowers and also the rubber parts in the inner face of the sidewall portion located at the same side of the tire are easily and repeatedly rubbed with each other in the unavoidable running under puncture to bring about the damage of the tire and further the rim assembling property and the tire weight become unfavorable. Moreover, the deformation quantity h of the tire is more preferably 35-50%.

Since the pneumatic tire 1 according to the invention is provided with the auxiliary load-supporting structure 12, the deformation quantity h of the tire is made small as compared with the ordinary pneumatic tire having no auxiliary load-supporting structure, so that it is supposed that the driver causes delay in the catching of the tire puncture and hence the running distance in the unavoidable running under puncture becomes long to enhance the possibility that the damage of the tire is caused due to such an unavoidable running. Because, the pneumatic tire according to the invention is merely provided with the auxiliary load-supporting structure capable of suppressing the damage of the tire in the unavoidable running under puncture but is not provided with the reinforcing structure capable of running over a significant distance (concretely, a running distance of about 200-300 km at a speed of 80 km/h without causing troubles in view of the steering performance) even if the tire is punctured as in the aforementioned run-flat tire.

For this end, the pneumatic tire according to the invention is further provided with the internal pressure alarm means 13 capable of detecting a puncture of the tire when the tire assembled onto a wheel rim and mounted onto a vehicle is punctured during the running in addition to the above auxiliary load-supporting structure, whereby the distance of the unavoidable running under puncture can be made short as far as possible and hence it can be effectively prevented to damage the tire to an unrecoverable extent in the unavoidable running under puncture.

In addition that the damage of the tire in the unavoidable running under puncture is suppressed by the internal pressure alarm means 13 in the pneumatic tire, the vehicle mounted with such a tire is equipped with the puncture repairing means for occluding a puncture hole of the tire and the gas filling means capable of refilling gas inside the tire up to the given internal pressure, whereby the punctured tire can be simply repaired after the vehicle is unavoidably run to a relatively short-range safe place and rapidly stopped at this place, and hence it is possible to restart the vehicle after the repairing of the tire.

An example of the process for repairing the punctured tire in the tire-rim assembly according to the invention will be described below.

At first, the pneumatic tire 1 provided with the auxiliary load-supporting structure 12 and the internal pressure alarm means 13 is assembled into an approved rim of a wheel and mounted onto a vehicle equipped with the puncture repairing means and the gas filling means.

If the tire 1 is punctured during the running of the vehicle, the driver catches a signal of the puncture detected by the internal pressure alarm manes and unavoidably moves the vehicle to the relatively short-range safe place and quickly stops the vehicle. Thereafter, the puncture hole of the tire is occluded by the puncture repairing means and gas is refilled inside the repaired tire up to the given internal pressure by the gas filling means, whereby it is possible to restart the vehicle.

In the invention, the internal pressure alarm means is not particularly limited, and the known alarm devices as disclosed in JP-A-2003-63221, JP-A-2003-159918 and JP-A-2003-165315 may be used. Also, the puncture repairing means and the gas filling means are not particularly limited, and the known puncture repairing kits as disclosed in JP-A-9-118779, JP-A-2001-212883 and JP-A-2000-103905 may be used.

As the auxiliary load-supporting structure, it is preferable to use a rubber reinforcing layer 12 arranged at an inner face side of the carcass (or between the plies of the carcass) and at least over a full region of the sidewall portion as shown in FIG. 1. In case of using the rubber reinforcing layer, it is preferable to adjust the thickness, hardness and the like of the rubber reinforcing layer to an adequate ranges enough to develop the function as the auxiliary load-supporting structure.

Further, the tire according to the invention is preferable to have an aspect ratio of 30-50% in view of the potential to the bending inherent to the tire size.

Moreover, it is preferable that the deformation quantity of the tire to be mounted on a front wheel of the vehicle is 35-45%, and the deformation quantity of the tire to be mounted on a rear wheel of the vehicle is 40-50% in view of the keeping of the ground contacting property in the deformation.

Although the above is described with respect to an embodiment of the invention, various modification can be conducted within a scope of the invention.

The following example is given in illustration of the invention and is not intended as limitation thereof.

A pneumatic tire used in the invention (Example 1) is prepared to have a cross-sectional view shown in FIG. 1 and a tire size of 245/45R17. In this case, the carcass 7 is comprised of two rubberized plies each containing rayon cords of 1650 d/2 arranged side by side at an angle of 90° with respect to an equatorial plane E of the tire. The two plies are wound around the respective bead core 2 and bead filler 3 (Shore A hardness: 85) located just above the bead core from an inside toward an outside in the widthwise direction of the tire, and each turnup end portion thereof is extended to each end portion of a belt 8 to form a so-called envelope structure. The belt 8 is arranged on an outer circumference of a crown portion of the carcass 7 and comprised of two main belt layers 9a, 9b, steel cords of which layers having a 1×5 twisting structure (cord diameter: 0.22 mm) and being crossed with each other with respect to the equatorial plane E (crossed at an angle of ±28° with respect to the equatorial plane E), and two auxiliary belt layers 10a, 10b each formed by spirally winding a ribbon-shaped member of rubberized polyethylene naphthalate cord of 1260 d/2 having a width of 6 mm substantially in parallel to the circumferential direction of the tire, in which an overlap width between the turnup end portion of the carcass and the end portion of the main belt layer is 30 mm. Also, the rim guard 11 having substantially a trapezoidal shape at a section is arranged on an outer face of the bead portion, and the rubber reinforcing layer 12 (maximum thickness: 7.5 mm, Shore A hardness: 85) is arranged at an inner face side of the carcass 7 over a full region of the sidewall portion 5 as an auxiliary load-supporting structure. The pneumatic tire 1 is assembled into a standard rim (8J×17) as a rim R. In the rubber reinforcing layer 12, a deformation quantity h (44 mm) of the tire in a radial direction thereof at a rim-assembled state under a load (625 kg) corresponding to 90% of a maximum load capacity at an internal tire pressure of zero is 40% of a section height H (110 mm) of the tire under no load at the internal tire pressure of zero. Moreover, as the internal pressure alarm means 13 is used the same alarm devices as disclosed in JP-A-2003-165315, and as the puncture repairing means and the gas filling means is used the same puncture repairing kit consisting of a sealant and an air filling device as disclosed in JP-A-9-118779.

For the comparison, there are prepared a conventional pneumatic tire (Conventional Example 1) having the same construction as in Example 1 except that the auxiliary load-supporting structure is not arranged and the deformation quantity h in the radial direction is 90%, and a side-reinforcing type run-flat tire (Conventional Example 2) in which the sidewall portion is strengthened with a rubber reinforcing layer (maximum thickness: 10 mm, Shore A hardness: 85) so as to have a deformation quantity in the radial direction of 25%. Moreover, the same puncture repairing kit as in Example 1 is used in Conventional example 1.

With respect to these tires, the following tests are carried out to evaluate the ride comfort and rolling resistance in usual running, performances at puncture and rim-assembling property.

1. Ride comfort

The ride comfort is evaluated by a driver's feeling when each tire is assembled into a standard rim (8J×17) and run on a test circuit course under conditions that a tire internal pressure is 210 kPa and a load applied to the tire is a load corresponding to two crewmen.

2. Rolling resistance

The rolling resistance is evaluated by a force type testing machine for rolling resistance when each tire is assembled into the standard rim and run on a rotating drum at 80 km/h under conditions of a tire internal pressure: 210 kPa and a load applied to the tire: 410 kgf.

3. Performances at puncture

As the performances at puncture, the steering performance is evaluated by a drum testing machine for the steering performance when each tire is assembled into the standard rim and run on a drum under conditions of a tire internal pressure: 30 kPa and a load applied to the tire: 625 kgf. Also, when a vehicle provided with each tire is run on a test circuit course, the steering performance just after the puncture and the steering performance when the vehicle is unavoidably run at a speed of 40 km/h over only a distance of 2 km after the puncture are evaluated by a driver's feeling. Further, it is evaluated whether or not the repaired tire can be durable to the usual running by breaking down the punctured tire to visually observe the presence or absence of damages on outer and inner faces of the sidewall portion.

4. Rim assembling property

The rim assembling property is evaluated by an operator's feeling in a Hoffman type rim assembling M/C.

These evaluation results are shown in Table 1. Moreover, all of numerical values in Table 1 are represented by an index value on the basis that Conventional example 1 is 100, in which the smaller the numerical value, the better the ride comfort and the rolling resistance, while the larger the numerical value, the better the steering performance at puncture.

TABLE 1

|  | Conventional Example 1 | Conventional Example 2 | Example 1 |
|---|---|---|---|
| Performances at puncture |  |  |  |
| Steering performance just after puncture | violent deterioration | substantially no deterioration | substantially no deterioration when the speed is decelerated |
| Steering performance in unavoidable running | steering in difficult | steerable without trouble | steerable without trouble when the speed is decelerated |
| Presence or absence of tire damage after unavoidable running | damage in inner and outer faces of sidewall portion | — | no tire damage |
| Whether or not restart can be conducted | unsuitable for restart | restartable | restartable |
| Steering performance | 100 | 200 | 160 |
| Performances in usual running |  |  |  |
| Ride comfort | 100 | 110 | 105 |
| Rolling resistance | 100 | 106 | 102 |
| Rim assembling property | good | bad | good |

As seen from the results of Table 1, the tires of Example 1 and Conventional Example 1 are excellent in the ride comfort and rim assembling property and low in the rolling resistance as compared with the tire of Conventional example 2 in the usual running at a normal state under a given internal pressure, and also the steering performance at puncture in the tire of Example 1 is somewhat poor as compared with Conventional Example 2 but is considerably excellent as compared with Conventional Example 1. In the tire of Conventional Example 1, the inner face of the sidewall portion is damaged by the unavoidable running under puncture, and even when the punctured tire is repaired in a repairing factory, the damaging portion remains in the tire and hence the punctured tire can not be turned to an original state before puncture. On the contrary, since the tire of example 1 is provided with the internal pressure alarm means, the driver can immediately catch the puncture of the tire, so that the distance in the unavoidable running under puncture can be made short, while the punctured tire can be simply repaired by the puncture repairing means and the gas filling means equipped on the vehicle and hence it is possible to restart the vehicle after the repairing.

INDUSTRIAL APPLICABILITY

As mentioned above, according to the invention, there can be provided a process for repairing a punctured pneumatic tire in a tire-rim assembly and a repairing system wherein the damage of the tire in the unavoidable running to a safe place at the puncture state can be effectively suppressed and the running of the tire repaired by only a simple repairing can be restarted by providing an auxiliary load-supporting structure not sacrificing the ride comfort and the rim assembling property in the running at the normal state under a given internal pressure, an internal pressure alarm means capable of detecting the puncture of the tire, a puncture repairing means and a gas filling means. In addition, the mounting of a spare tire onto a vehicle can be omitted likewise the run-flat tire.

The invention claimed is:

1. A process for monitoring a tire condition and repairing a punctured pneumatic tire having a structure of controlling the damage of the tire produced by the unavoidable running in the punctured state in a tire-rim assembly which comprises:
   mounting on a vehicle an assembly of a pneumatic tire and an approved rim provided with means for raising an internal pressure alarm, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that a deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;
   detecting a puncture of the tire produced during the running of the tire by the means for raising an internal pressure alarm;
   unavoidably running the punctured tire to a relatively short-range safe place to quickly stop the vehicle; and
   refilling gas inside the tire, which is emitted due to the puncture, to a given internal pressure by a gas filling means equipped on the vehicle while occluding a punctured hole with a puncture repairing means equipped on the vehicle;
   and wherein the auxiliary load-supporting structure is constructed so as not to at least contact inner surface parts located at the same sidewall portion with each other even in the unavoidable running at the puncture state.

2. A process for repairing a punctured pneumatic tire in a tire-rim assembly according to claim 1, wherein the deformation quantity of the tire is within a range of 35-50%.

3. A process for repairing a punctured pneumatic tire in a tire-rim assembly according to claim 1, wherein the tire has an aspect ratio of 30-55%.

4. A process for repairing a punctured pneumatic tire in a tire-rim assembly according to claim 1, wherein the deformation quantity of the tire to be mounted on a front wheel of the vehicle is 35-45%.

5. A process for repairing a punctured pneumatic tire in a tire-rim assembly according to claim 1, wherein the deformation quantity of the tire to be mounted on a rear wheel of the vehicle is 40-50%.

6. A process for monitoring a tire condition and repairing a punctured pneumatic tire having a structure of controlling the damage of the tire produced by the unavoidable running in the punctured state in a tire-rim assembly which comprises:
   mounting on a vehicle an assembly of a pneumatic tire and an approved rim provided with means for raising an internal pressure alarm, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that a deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;
   detecting a puncture of the tire produced during the running of the tire by the means for raising an internal pressure alarm;
   unavoidably running the punctured tire to a relatively short-range safe place to quickly stop the vehicle: and
   refilling gas inside the tire, which is emitted due to the puncture, to a given internal pressure by a gas filling means equipped on the vehicle while occluding a punctured hole with a puncture repairing means equipped on the vehicle;
   and wherein the auxiliary load-supporting structure is a thin-walled rubber reinforcing layer arranged between the plies of the carcass or at an inner surface side of the carcass and at least over a full region of the sidewall portion.

7. A process for repairing a punctured pneumatic tire in a tire-rim assembly according to claim 6, wherein the tire has an aspect ratio of 30-55%.

8. A process for repairing a punctured pneumatic tire in a tire-rim assembly according to claim 6, wherein the deformation quantity of the tire to be mounted on a front wheel of the vehicle is 35-45%.

9. A process for repairing a punctured pneumatic tire in a tire-rim assembly according to claim 6, wherein the deformation quantity of the tire to be mounted on a rear wheel of the vehicle is 40-50%.

10. A system for monitoring a tire condition and repairing a punctured pneumatic tire having a structure of controlling the damage of the tire produced by the unavoidable running in the punctured state in a tire-rim assembly mounted on a vehicle comprising:
    an assembly of a pneumatic tire and an approved rim, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that a deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;
    means provided on the tire-rim assembly for detecting a puncture of the tire during the running and raising an internal pressure alarm;
    a puncture repairing means equipped on the vehicle for occluding a puncture hole of the tire; and a gas filling means provided on the vehicle for refilling gas inside the tire, which is emitted due to the puncture, to a given internal pressure;

and wherein the auxiliary load-supporting structure is constructed so as not to at least contact inner surface parts located at the same sidewall portion with each other even in the unavoidable running at the puncture state.

11. A system for monitoring a tire condition and repairing a punctured pneumatic tire according to claim 10, wherein the tire has an aspect ratio of 30-55%.

12. A system for monitoring a tire condition and repairing a punctured pneumatic tire according to claim 10, wherein the deformation quantity of the tire to be mounted on a front wheel of the vehicle is 35-45%.

13. A system for monitoring a tire condition and repairing a punctured pneumatic tire according to claim 10, wherein the deformation quantity of the tire to be mounted on a rear wheel of the vehicle is 40-50%.

14. A system for monitoring a tire condition and repairing a punctured pneumatic tire having a structure of controlling the damage of the tire produced by the unavoidable running in the punctured state in a tire-rim assembly mounted on a vehicle comprising:

an assembly of a pneumatic tire and an approved rim, said pneumatic tire comprising a carcass of at least one ply toroidally extending from a pair of bead portions to a tread portion through a pair of sidewall portions, a belt of at least one belt layer arranged on an outer circumference of a crown portion of the carcass, and an auxiliary load-supporting structure satisfying a requirement that a deformation quantity of the tire in a radial direction thereof at a rim-assembled state under a load corresponding to 90% of a maximum load capacity at an internal tire pressure of zero is within a range of 30-60% of a section height of the tire under no load at the internal tire pressure of zero;

means provided on the tire-rim assembly for detecting a puncture of the tire during the running and raising an internal pressure alarm;

a puncture repairing means equipped on the vehicle for occluding a puncture hole of the tire; and a gas filling means provided on the vehicle for refilling gas inside the tire, which is emitted due to the puncture, to a given internal pressure;

and wherein the auxiliary load-supporting structure is a thin-walled rubber reinforcing layer arranged between the plies of the carcass or at an inner surface side of the carcass and at least over a full region of the sidewall portion.

15. A system for monitoring a tire condition and repairing a punctured pneumatic tire according to claim 14, wherein the tire has an aspect ratio of 30-55%.

16. A system for monitoring a tire condition and repairing a punctured pneumatic tire according to claim 14, the deformation quantity of the tire to be mounted on a front wheel of the vehicle is 35-45%.

17. A system for monitoring a tire condition and repairing a punctured pneumatic tire according to claim 14, wherein the deformation quantity of the tire to be mounted on a rear wheel of the vehicle is 40-50%.

* * * * *